(12) United States Patent
Cook et al.

(10) Patent No.: US 12,291,663 B2
(45) Date of Patent: May 6, 2025

(54) MATRIX FORMULATION FOR POLYMER DISPERSED LIQUID CRYSTAL DISPLAYS IN LOW POWER DIRECT CURRENT (DC) ELECTROMAGNETIC FIELD APPLICATION

(71) Applicant: Lawrence Livermore National Security, LLC, Livermore, CA (US)

(72) Inventors: Caitlyn C. Cook, Livermore, CA (US); Elaine Lee, Brooklyn, NY (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 243 days.

(21) Appl. No.: 16/692,567

(22) Filed: Nov. 22, 2019

(65) Prior Publication Data

US 2020/0165520 A1 May 28, 2020

Related U.S. Application Data

(60) Provisional application No. 62/771,948, filed on Nov. 27, 2018.

(51) Int. Cl.
*C09K 19/54* (2006.01)
*C08F 220/14* (2006.01)
(Continued)

(52) U.S. Cl.
CPC .......... *C09K 19/544* (2013.01); *C08F 220/14* (2013.01); *G02F 1/13306* (2013.01); *G02F 1/1334* (2013.01); *C09K 2019/546* (2013.01)

(58) Field of Classification Search
CPC ............................ G02F 1/1334; C09K 19/544
See application file for complete search history.

(56) References Cited

U.S. PATENT DOCUMENTS

| 5,498,365 A | * | 3/1996 | Nolan | C09K 19/544 |
| | | | | 252/299.1 |
| 5,523,127 A | * | 6/1996 | Ohnishi | C09K 19/544 |
| | | | | 252/299.65 |

(Continued)

FOREIGN PATENT DOCUMENTS

| CN | 103360794 A | 10/2013 |
| CN | 108803119 A | * 11/2018 |

(Continued)

OTHER PUBLICATIONS

English translation of JP2004219948. (Year: 2004).*

(Continued)

*Primary Examiner* — Geraldina Visconti
*Assistant Examiner* — Anna Malloy
(74) *Attorney, Agent, or Firm* — Zilka-Kotab, P.C.

(57) ABSTRACT

A pre-polymer matrix formulation for a polymer dispersed liquid crystal (PDLC) display includes, in one aspect, a monofunctional monomer, a trifunctional oligomer, and a trifunctional monomer. A product, in another aspect, includes a PDLC display formulation comprising a polymer matrix having a plurality of liquid crystal (LC) domains dispersed therein, wherein the polymer matrix comprises a polymerized product of a monofunctional monomer, a trifunctional oligomer, and a trifunctional monomer, and a pair of electrodes having the PDLC display formulation positioned therebetween. The PDLC display formulation is characterized as having a substantially constant optical transparency during application of a low power direct current (DC) electromagnetic field between the electrodes for a predefined duration of time.

19 Claims, 11 Drawing Sheets

(51) Int. Cl.
  *G02F 1/133* (2006.01)
  *G02F 1/1334* (2006.01)

(56) References Cited

U.S. PATENT DOCUMENTS

| | | | |
|---|---|---|---|
| 5,525,273 A * | 6/1996 | Konuma | G02F 1/1334 264/1.36 |
| 5,843,332 A * | 12/1998 | Takeuchi | C09K 19/544 349/183 |
| 5,959,707 A | 9/1999 | Murai et al. | |
| 2002/0071646 A1 * | 6/2002 | Eggleton | G02B 6/02366 385/125 |
| 2003/0025865 A1 | 2/2003 | Takatori et al. | |
| 2008/0316395 A1 | 12/2008 | O'Keeffe | |
| 2014/0080040 A1 * | 3/2014 | Fontecchio | G03H 1/28 430/2 |

FOREIGN PATENT DOCUMENTS

| | | | |
|---|---|---|---|
| EP | 0205261 A2 * | 5/1986 | |
| JP | 07239465 A * | 9/1995 | |
| JP | 2004219948 A * | 8/2004 | |

OTHER PUBLICATIONS

English translation of JP07239465. (Year: 1995).*
English translation of CN108803119. (Year: 2018).*
Drzaic, P. "Chapter 5, Applications", Sep. 1995, Liquid Crystal Dispersions, vol. 1, 353-424. (Year: 1995).*
International Search Report and Written Opinion from PCT Application No. PCT/US2019/062915, dated Apr. 2, 2020.
Murray et al., "Electrically Controllable Light Trapping for Self-Powered Switchable Solar Windows," ACS Photonics, vol. 4, 2017, pp. 1-7.
International Preliminary Examination Report from PCT Application No. PCT/US2019/062915, dated Jun. 10, 2021.
Margerum et al., "Addressing factors for polymer-dispersed liquid crystal displays," Proceedings of SPIE, Liquid-Crystal Devices and Materials, vol. 1455, Jun. 1, 1991, pp. 27-38.
Serbutoviez et al., "Polymerization-Induced Phase Separation. 2. Morphology of Polymer-Dispersed Liquid Crystal Thin Films," Macromolecules, American Chemical Society, vol. 29, No. 24, 1996, pp. 7690-7698.
Chang et al., "An Investigation into the Morphology and Electro-Optical Properties of 2-Hydroxy Ethyl Methacrylate Polymer Dispersed Liquid Crystals," Journal of Applied Polymer Science, vol. 18, 2010, pp. 1349-1355.
Drzaic, P. "Chapter 2, Recipes," Liquid Crystal Dispersions, vol. 1, Sep. 1995, pp. 11-97.
Drzaic, P. "Chapter 5, Applications, " Liquid Crystal Dispersions, vol. 1, Sep. 1995, pp. 353-424.
USPTO, "Examining Functional Claim Limitations: Focus on Computer/Software-related Claims," USPTO presentation, May 2015, 33 pages, retrieved from https://www.uspto.gov/video/cbt/examining-functional-claim-limitations-computer-software/index.html.

* cited by examiner

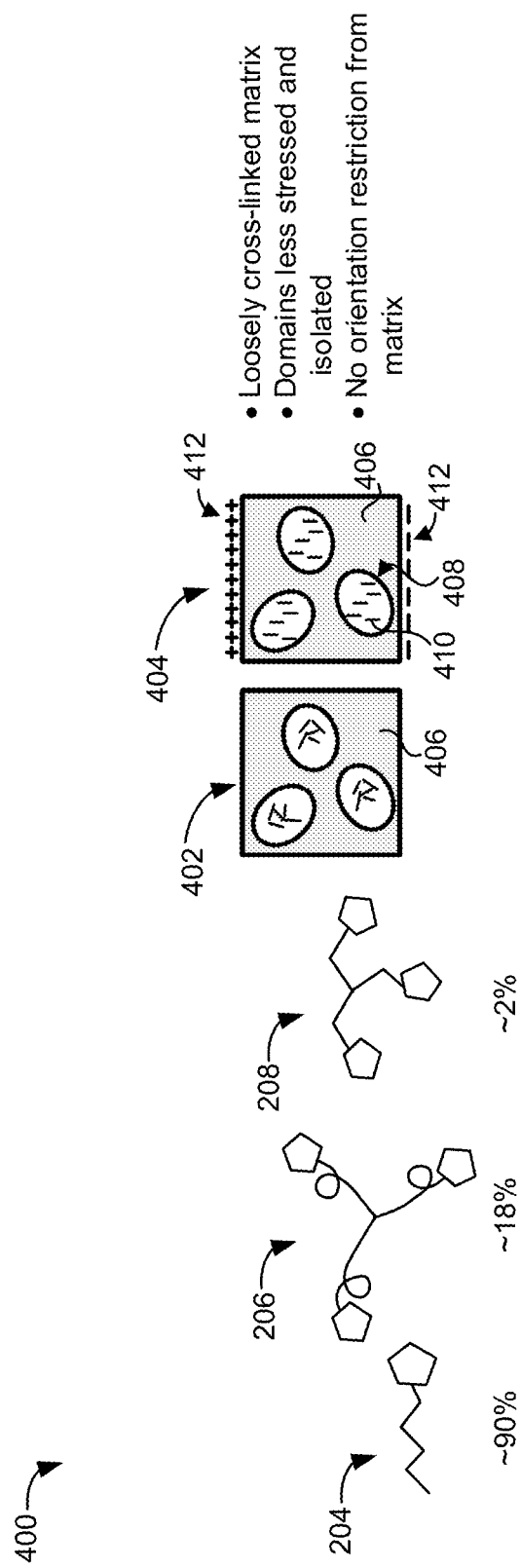

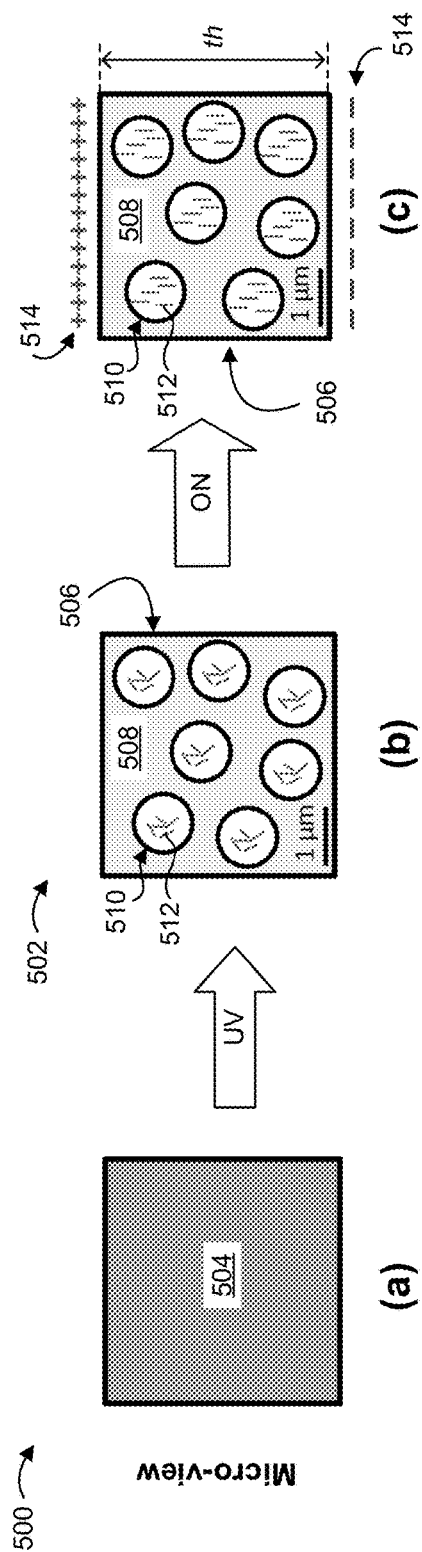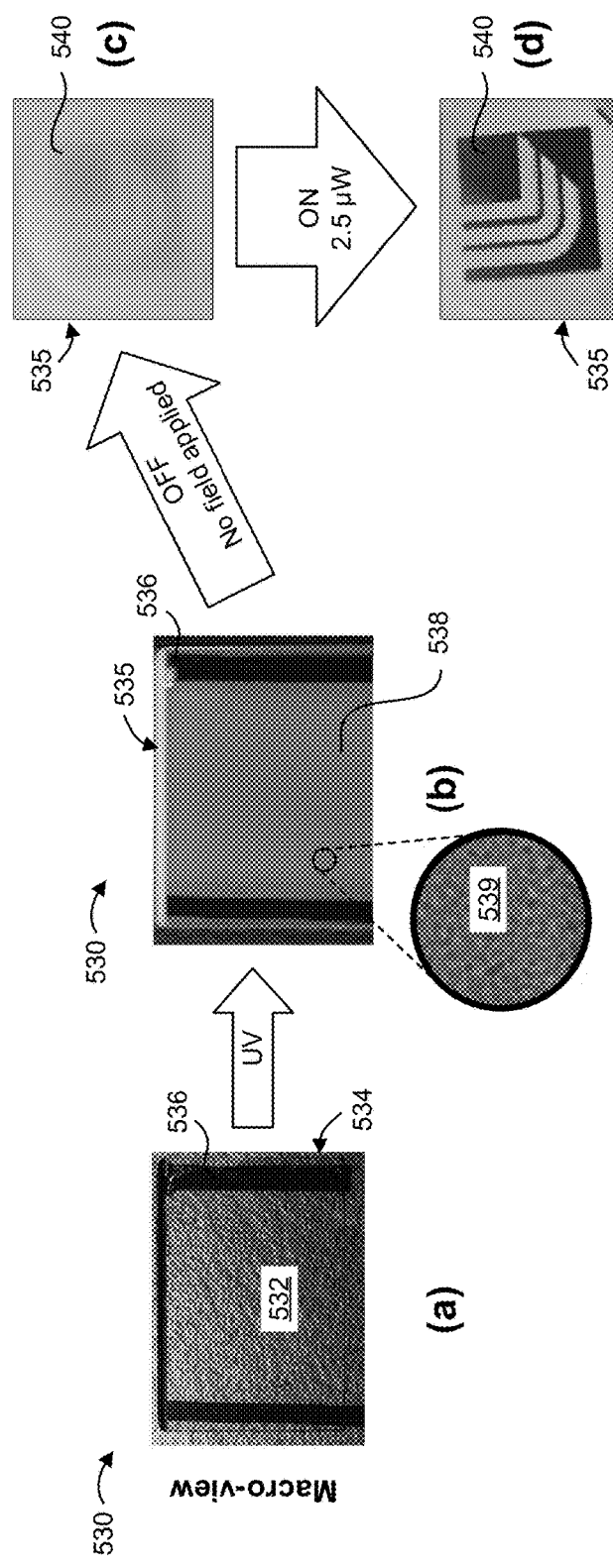
FIG. 5A
FIG. 5B

MATRIX FORMULATION FOR POLYMER DISPERSED LIQUID CRYSTAL DISPLAYS IN LOW POWER DIRECT CURRENT (DC) ELECTROMAGNETIC FIELD APPLICATION

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to additive manufacturing, and more particularly, this invention relates to a polymer matrix formulation for low power direct current (DC) electromagnetic field conditions, in particular to a photosensitive thermosetting matrix for high optical contrast with low power DC electromagnetic field conditions.

BACKGROUND

Current polymer dispersed liquid crystal (PDLC) products are used in many applications, such as smart windows, flexible electronic displays, self-powered wearables, condition monitoring, and human interactivity. To date, PDLC displays rely on application of an alternating current (AC) electromagnetic field which involves rapid pulses of current that activate a transparency effect in PDLC in millisecond pulses so that the display appears to be in a constant transparent display. However, in reality, the field is switching between positive to negative at a very fast rate. Thus, an AC system utilizes more power, and the circuitry of the AC electromagnetic field is more complicated than a direct current (DC) electromagnetic field that involves simply turning on a switch.

However, development of a DC-operated PDLC display has shown that applying a DC electromagnetic field for extended amounts of time induces ion migration that damages PDLC layers. The damage in part may have been due to the high power of the applied DC electromagnetic fields used in these systems. Further, there can be theoretical nonlinearity when operating with a DC electromagnetic field.

Application of a DC electromagnetic field on a conventional PDLC display (engineered for AC power) tends to result in relaxation of transparency, e.g., a decrease in optical transparency. It would be desirable to engineer a matrix formulation specifically for a PDLC display operated under a low power DC electromagnetic field.

However, approaches to develop a PDLC display formulation of high contrast and complete phase separation using low DC power remain elusive.

SUMMARY

According to one aspect of an inventive concept, a pre-polymer matrix formulation for a polymer dispersed liquid crystal (PDLC) display includes a monofunctional monomer, a trifunctional oligomer, and a trifunctional monomer.

According to another aspect of an inventive concept, a product includes a PDLC display formulation comprising a polymer matrix having a plurality of liquid crystal (LC) domains dispersed therein, wherein the polymer matrix comprises a polymerized product of a monofunctional monomer, a trifunctional oligomer, and a trifunctional monomer, and a pair of electrodes having the PDLC display formulation positioned therebetween. The PDLC display formulation is characterized as having a substantially constant optical transparency during application of a low power direct current (DC) electromagnetic field between the electrodes for a predefined duration of time.

According to yet another aspect of an inventive concept, a system includes a PDLC display formulation comprising a polymer matrix having a plurality of LC domains dispersed therein, a first substrate and a second substrate, where the PDLC display formulation is disposed between the first and second substrates. The polymer matrix includes a polymerized product of a monofunctional monomer, a trifunctional oligomer, and a trifunctional monomer. Moreover, the system includes at least one electrode layer where the PDLC display formulation is positioned adjacent to the at least one electrode layer, and a power circuit for applying a DC electromagnetic field across the at least one electrode layer.

Other aspects and advantages of the present invention will become apparent from the following detailed description, which, when taken in conjunction with the drawings, illustrate by way of example the principles of the invention.

BRIEF DESCRIPTION OF DRAWINGS

FIG. 4 is a schematic diagram of an optimized pre-polymer formulation for polymer dispersed liquid crystal (PDLC) display formulation with DC electromagnetic field application, according to one aspect of an inventive concept.

Parts (a), (b), and (c) of FIG. 5A are schematic diagrams of a micro-view of forming a PDLC display formulation, according to one aspect of an inventive concept.

Parts (a), (b), (c), and (d) of FIG. 5B are images of a macro-view of forming a PDLC display formulation, according to one aspect of an inventive concept.

Figure 6:
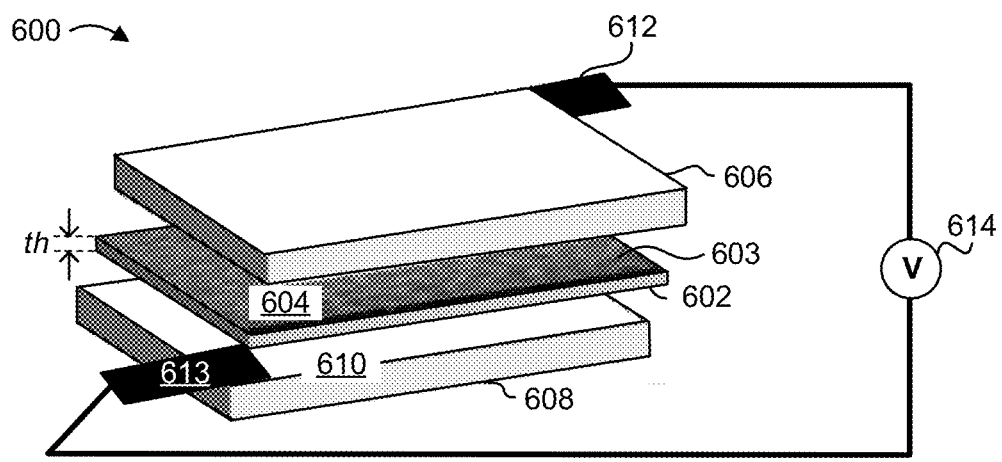

FIG. 6 is a schematic drawing of a PDLC display stacking structure, according to one aspect of an inventive concept.

Figure 7A:
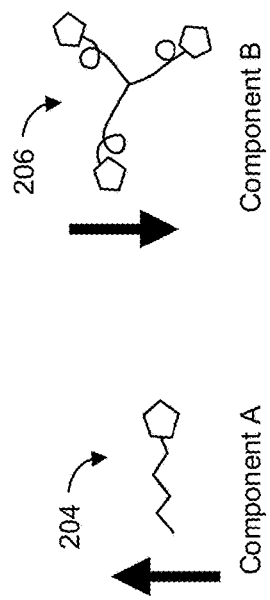

FIG. 7A is a schematic diagram of components of a pre-polymer formulation, according to one aspect of an inventive concept.

Figure 7C:
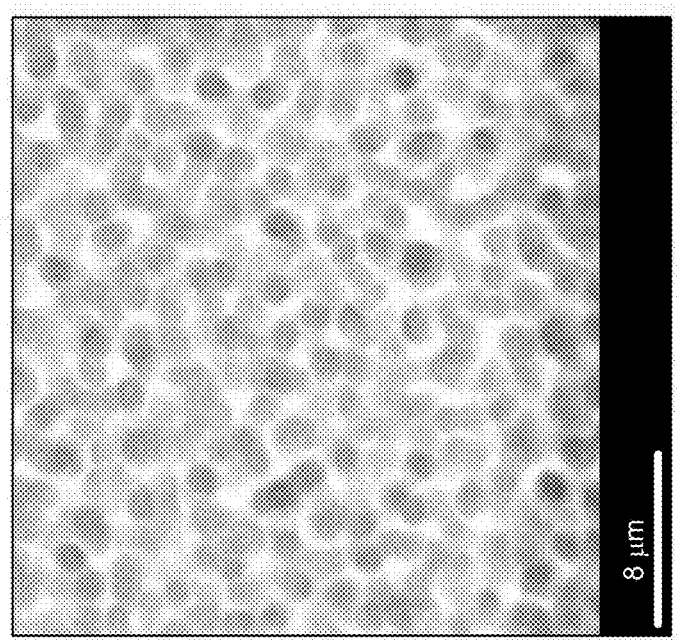
Figure 7B:
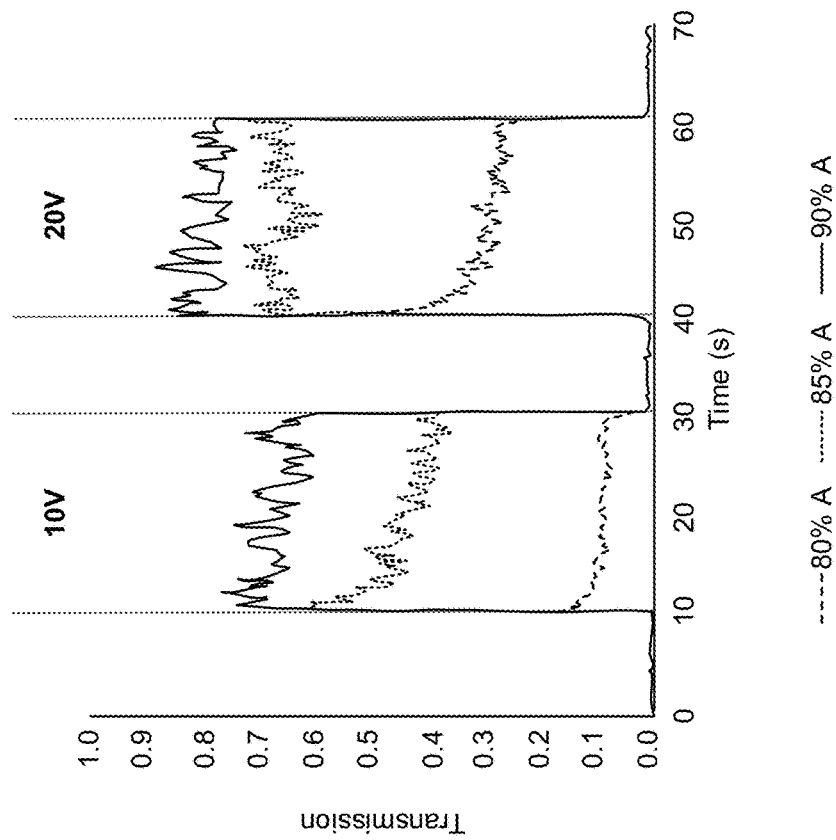

FIG. 7B is a plot of transmission data as a function of applied DC electromagnetic field of various formulations of pre-polymer matrix during DC electromagnetic field application, according to one aspect of an inventive concept.

FIG. 7C is a scanning electron microscope (SEM) image of LC domains in a polymer matrix having 90 wt % Component A, according to one aspect of an inventive concept.

Figure 8B:
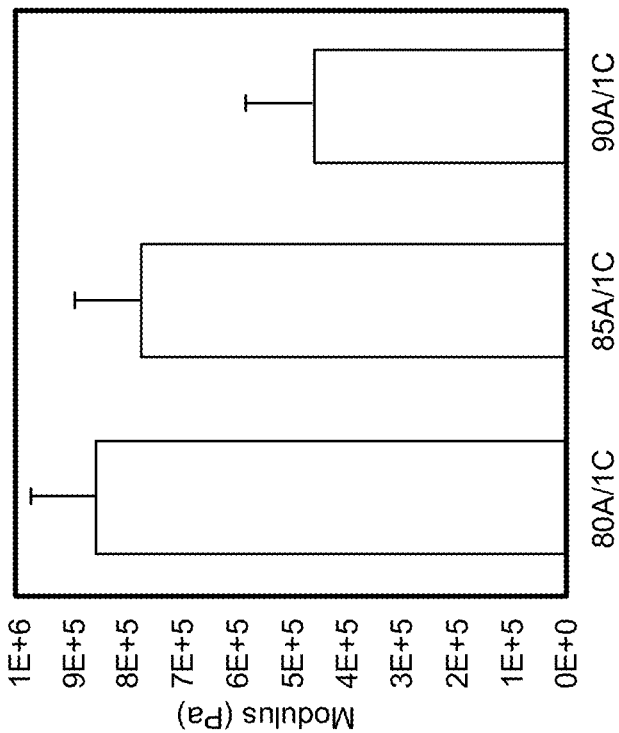
Figure 8A:
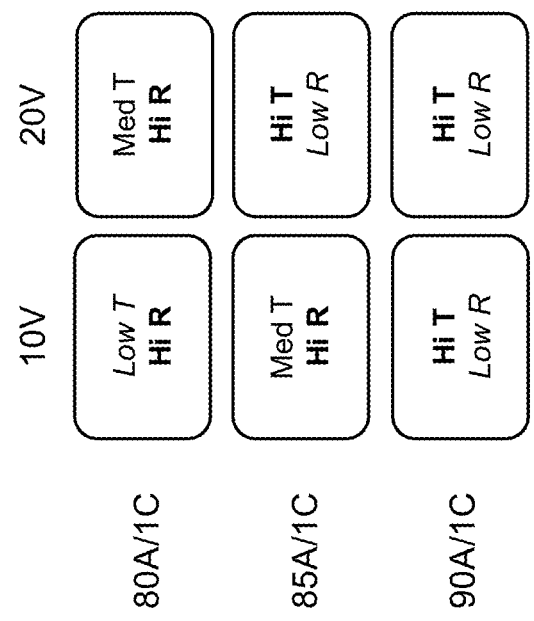

FIG. 8A is a transmissivity vs relaxation summary diagram of various formulations of pre-polymer matrix, according to various aspect of an inventive concepts.

FIG. 8B is a plot of the modulus of pre-polymer formulations having increased ratios of component A to component C, according to various aspect of an inventive concepts.

Figure 9:
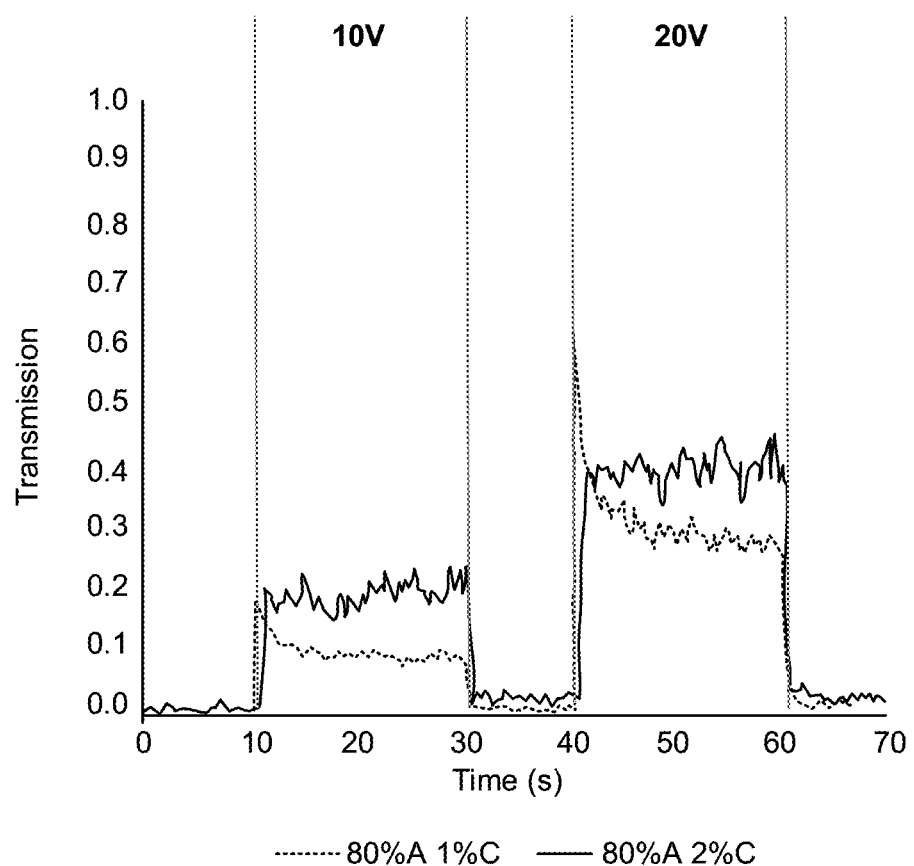

FIG. 9 is a plot of relaxation data comparing formulations having different concentrations of component C, according to one aspect of an inventive concept.

Figure 10:
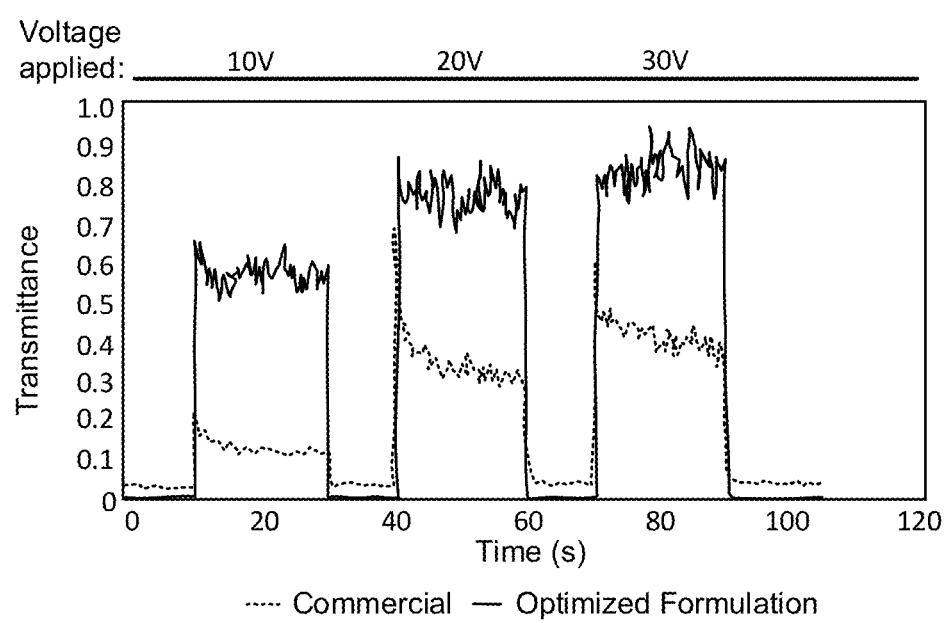

FIG. 10 is a plot of relaxation data generated from a commercially available matrix resin compared to an inventive matrix formulation, according to one aspect of an inventive concept.

Figure 11:
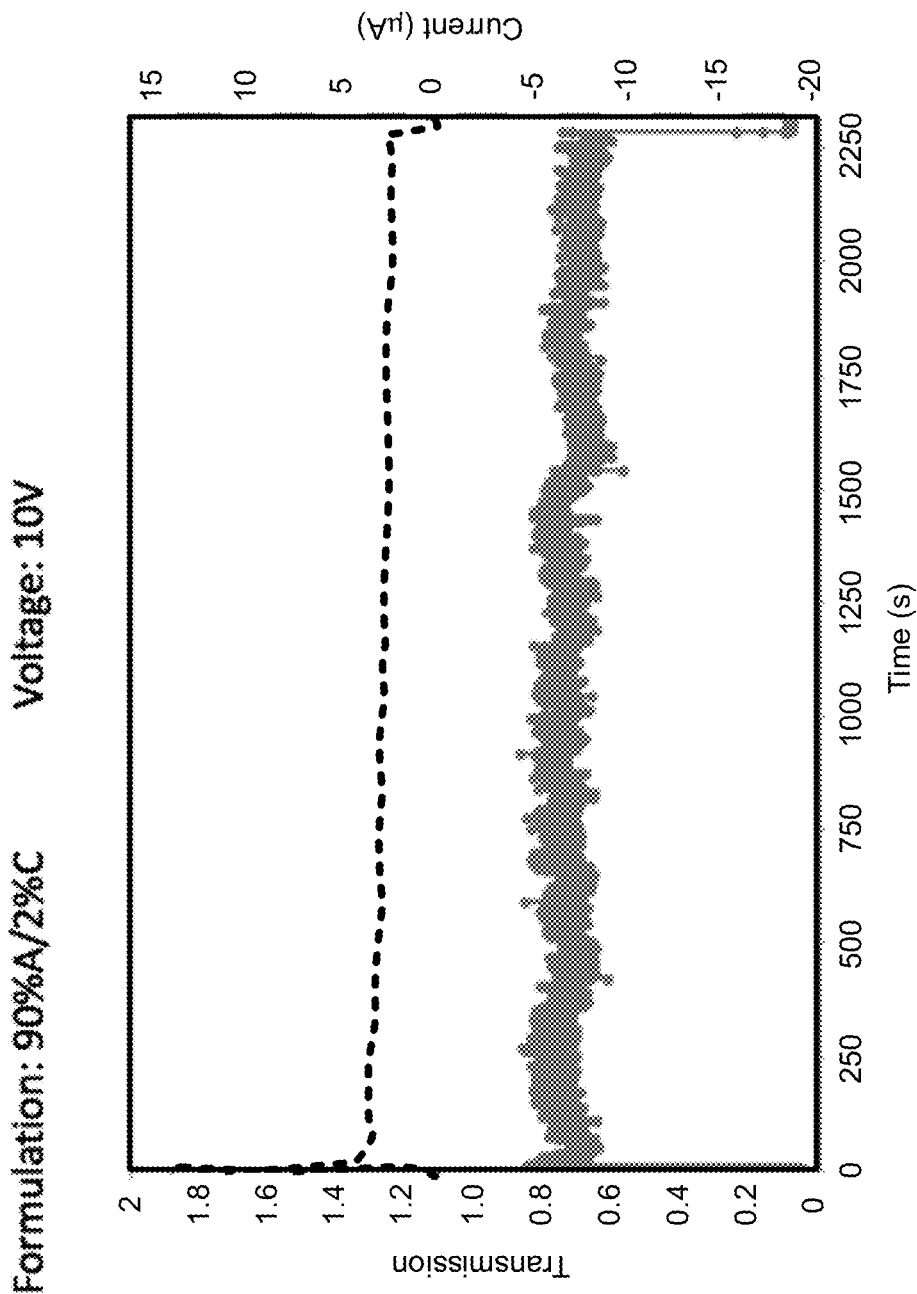

FIG. 11 is a plot of transmission of an optimized PDLC display formulation over an extended period of time of applied direct current, according to one aspect of an inventive concept.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred aspects of an inventive concept of a polymer matrix formulation for lower power direct current electromagnetic field conditions and/or related systems and methods.

In one general aspect of an inventive concept, a pre-polymer matrix formulation for a polymer dispersed liquid crystal (PDLC) display includes a monofunctional monomer, a trifunctional oligomer, and a trifunctional monomer.

In another general aspect of an inventive concept, a product includes a PDLC display formulation comprising a polymer matrix having a plurality of liquid crystal (LC) domains dispersed therein, wherein the polymer matrix comprises a polymerized product of a monofunctional monomer, a trifunctional oligomer, and a trifunctional monomer, and a pair of electrodes having the PDLC display formulation positioned therebetween. The PDLC display formulation is characterized as having a substantially constant optical transparency during application of a low power direct current (DC) electromagnetic field between the electrodes for a predefined duration of time.

In yet another general aspect of an inventive concept, a system includes a PDLC display formulation comprising a polymer matrix having a plurality of LC domains dispersed therein, a first substrate and a second substrate, where the PDLC display formulation is disposed between the first and second substrates. The polymer matrix includes a polymerized product of a monofunctional monomer, a trifunctional oligomer, and a trifunctional monomer. Moreover, the system includes at least one electrode layer where the PDLC display formulation is positioned adjacent to the at least one electrode layer, and a power circuit for applying a DC electromagnetic field across the at least one electrode layer.

A list of acronyms used in the description is provided below.

AC Alternating current
DC Direct current
LC Liquid crystal
ms millisecond
nm nanometer
PDLC Polymer dispersed liquid crystal
s second
UV Ultraviolet
μm micron
μW microwatt
V volts
Wt % weight percent Processing PDLC displays includes preparing a pre-polymer and liquid crystal (LC) mixture, followed by polymerization by ultra-violet (UV) light to induce phase separation of the LC domains to scatter light. The transition of the PDLC from opaque (off) to transparent (on) has typically been powered in conventional systems using an alternating current (AC) electromagnetic field. The AC electromagnetic field has long been considered to be preferred to maintain high optical transparency over extended periods of time. However, it would be advantageous to apply a DC electromagnetic field since a DC electromagnetic field uses five times less power than an AC electromagnetic field over a 20 second interval.

According to one aspect of an inventive concept, an optimized formulation of flexible polymer dispersed liquid crystal (PDLC) displays may be used in low power direct current (DC) electromagnetic field applications. In contrast to AC systems where the first few milliseconds generate the transparency effect, in various approaches described herein, in a holding DC power field, a transparency effect is generated. Applying a DC electromagnetic field to conventional PDLC displays optimized for AC electromagnetic field causes the displays to exhibit transparency for the first ~10 ms, but then initial transparency is followed by a quick decay in transparency to a more translucent state.

It is likely that studies of PDLC displays and the associated underlying formulations have been limited to optimization for use with an AC electromagnetic field due to the misconception that using DC electromagnetic field for extended amounts of time may induce damage to the PDLC layer for all polymer matrix formulations. As described herein, in one approach, a finely-tuned acrylate-based formulation as the PDLC thermosetting matrix may achieve non-variable optical clarity with DC electromagnetic field at low-power conditions. Moreover, as observed in various aspects of an inventive concept described herein, the matrix remains intact, e.g., without breakdown of the matrix.

In conventional systems, commercial formulations of polymer matrix of a PDLC display are optimized for an applied AC electromagnetic field and include large tolerances of each component of the formulation. Thus, when these commercial formulations optimized for an AC electromagnetic field are used with a DC electromagnetic field, the PDLC display may result in transparency relaxation. It is desirable to maintain transparency in a PDLC display, so an AC-tuned formulation of a polymer matrix of a PDLC display may likely not apply as a formulation of a polymer matrix of a PDLC display for an applied DC electromagnetic field.

The transparency relaxation effect typically demonstrated with commercial formulations of a polymer matrix of a PDLC display under application of a DC electromagnetic field may be explained by the anchoring effect of the LC molecules of an LC domain by the surrounding matrix. Anchoring may be defined as interfacial forces from the polymer matrix acting upon the LC molecules (that form an LC domain). When the modulus of the matrix is low, then there is low probability of anchoring the LC domains dispersed through the matrix, and thus there tends to be minimal relaxation of the aligned orientation of the LC molecules. When the modulus of the matrix is high, then there is a high probability of anchoring of the LC molecules, and the surrounding matrix interacts with the LC domains thereby causing relaxation of the aligned orientation of the LC molecules, and consequently loss of transparency.

Figure 1:
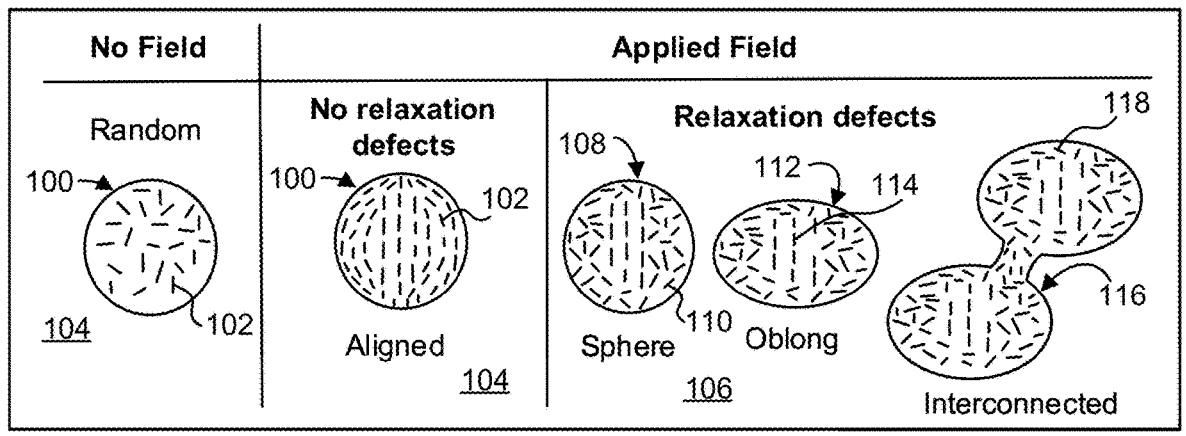
FIG. 1 is a schematic diagram of LC domain orientation with no field applied and potential LC domain orientation conformations during static field application.

The schematic drawing in FIG. 1 illustrates the restrictions on LC domains 100 comprised of LC molecules 102 that may cause the relaxation of transparency during initial high optical contrast during an applied field. FIG. 1 shows a schematic drawing of an LC domain 100 in a polymer matrix 104 of a PDLC display having no field applied where the LCs molecules 102 are in random order. Under applied field, when there are no relaxation effects, the LC molecules 102 are aligned in orientation of the field. However, a polymer matrix 106 may incur modular stress on the LC molecules 102 as shown with the LC domains 108, 112, and 116 under applied field.

Exposure of the pre-polymer matrix formulation including LC molecules to UV irradiation causes domains of LC molecules as a result of photo-induced phase separation. The PDLC display formulation is formed after UV exposure and includes LC domains trapped in the polymer matrix. The orientation of the LC molecules within the LC domains of the PDLC display formulation may be affected by the components of the polymer matrix formulation.

Anchoring of the LC molecules in the LC domains may result in, but are not limited to, spherical LC domains 108, oblong LC domains 112, and interconnected neighboring LC domains 116. A spherical LC domain 108 may include an anchoring effect of the LC molecules 110 such that only the centermost LC molecules are aligned and the LC molecules on the edges of the LC domain 108 may be slightly soluble with the matrix resulting in a disorientation of the molecules 110. An oblong LC domain 112 may be formed by high matrix moduli having a similar effect to spherical LCs in which only the centermost LC molecules 114 may be aligned. Interconnected neighboring LC domains 116 may have some anchoring effects in between the interconnect as well as on the sides of the LC domains 116, and the matrix may affect more portions of the LC molecules 118 within the domains 116.

According to various aspects of an inventive concepts described herein, a matrix formulation for a PDLC display that operates under an applied DC electromagnetic field includes a finely tuned formulation to mitigate optical relaxation of the LC component of the matrix.

According to one aspect of an inventive concept, an apparatus includes a PDLC display formulation for non-variable high optical contrast under low power DC electromagnetic field conditions. During fabrication of the PDLC display formulation, a photosensitive thermosetting pre-polymer matrix may aid polymerization-induced phase separation from the liquid crystal (LC) during curing of the PDLC display media (e.g., UV light exposure). In contrast to earlier studies that describe methods to align liquid crystals with alternating current (AC) electromagnetic field, the formulation described herein has been optimized to maintain a steady-state transparency during DC power application.

Typical commercial polymer matrix formulations for AC electromagnetic fields are optimized for the initial 10 millisecond (ms) to 100 ms pulsed current of optical clarity. According to various approaches described here, a polymer matrix formulation designed for DC applied electromagnetic fields may sustain the optical clarity for the entire duration of applying the DC electromagnetic field.

According to one aspect of an inventive concept, a pre-polymer formulation for a PDLC display is described that may include three components, where each component has at least one reactive functional group. The three components of the pre-polymer formulation may vary in molecular weight and functionality. In one approach, the pre-polymer formulation is an acrylate-based formulation where each of the components includes an acrylate. In various approaches of the pre-polymer formulation, one of the three components may be included to fine tune the LC domain size in order to reduce transparency relaxation when a static field is applied across the PDLC display, while maintaining a high electro-optical contrast ratio. In one approach, two components of the three components of the pre-polymer formulation may contribute to matrix stress reduction on the LC domains. In some approaches, the pre-polymer formulation is a photosensitive thermosetting matrix formulation. During UV curing, a mixture of the pre-polymer formulation and the liquid crystal (LC) molecules undergo phase separation where the LC molecules form LC domains with minimal anchoring caused by the polymer matrix. In one approach, the pre-polymer formulation may be tailored to optimize a fast (e.g., less than 10 seconds) photopolymerization-induced phase separation of the LC molecules from the multicomponent polymer matrix.

Preferably, the photosensitive thermosetting matrix formulation is optimized to reduce anchoring with the polymer matrix and reduce solubility of the LC in the polymer matrix post phase separation. In a non-restricted and perfectly spherical liquid crystal domain (e.g., minimal anchoring effects), the liquid crystal compounds within a domain may be randomly oriented until aligned in the direction of an applied electromagnetic field.

Figure 2A:
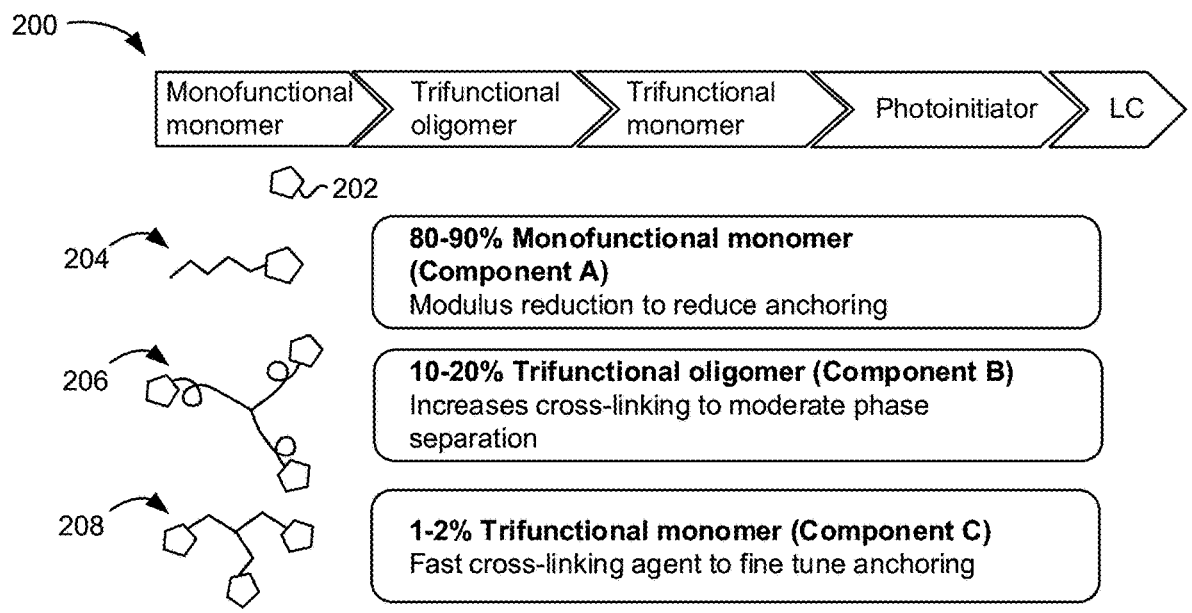
FIG. 2A is an optimized formulation of a pre-polymer matrix for mitigating transparency relaxation, according to one aspect of an inventive concept.
Figure 2B:
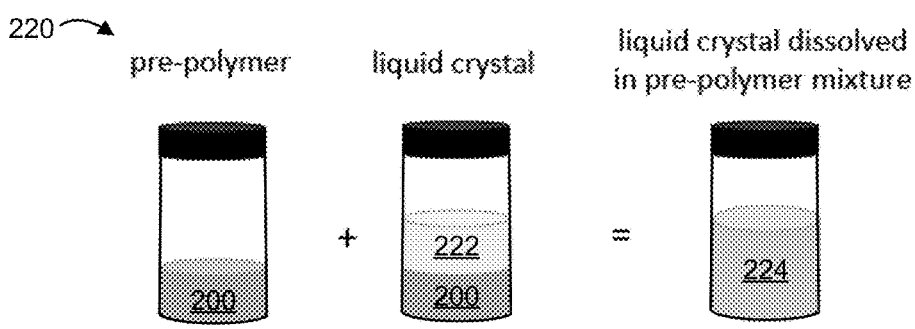
FIG. 2B is a is a schematic diagram of the PDLC mixing procedure, according to one aspect of an inventive concept.
Figure 2C:
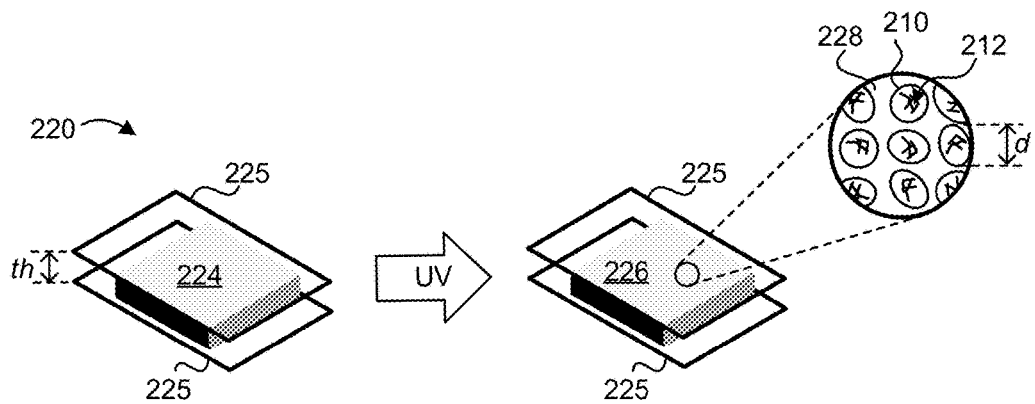
FIG. 2C is a schematic diagram of photo-induced phase separation of a PDLC display formulation, according to one aspect of an inventive concept.

FIGS. 2A-2C depict a pre-polymer formulation 200 for a polymer dispersed liquid crystal (PDLC) display, in accordance with one aspect of an inventive concept. As an option, the present pre-polymer formulation 200 may be implemented in conjunction with features from any other aspect of an inventive concept listed herein, such as those described with reference to the other FIGS. Of course, however, such pre-polymer formulation 200 and others presented herein may be used in various applications and/or in permutations which may or may not be specifically described in the illustrative aspects of an inventive concepts listed herein. Further, the pre-polymer formulation 200 presented herein may be used in any desired environment.

As shown in FIG. 2A, according to one aspects of an inventive concept, a pre-polymer matrix formulation 200 for a PDLC display includes compounds having at least one reactive functional group 202. In a preferred approach, the functional group may be an acrylate. In another approach, the functional group may be a mercaptan. In yet another approach, the functional group may be an epoxide. In yet another approach, the functional group may be a vinyl group.

In various approaches, the components of the pre-polymer matrix may include a combination of reactive functional groups. For example, the following combinations of reactive functional groups may include: acrylate-acrylate, acrylate-mercaptan, mercaptan-vinyl, mercaptan-epoxide, epoxide-epoxide, etc.

In one approach, the pre-polymer matrix formulation 200 includes a monofunctional monomer 204 (e.g., component A), a trifunctional oligomer 206 (e.g., component B), and a trifunctional monomer 208 (e.g., component C). The monofunctional monomer 204 may provide a modulus reduction to reduce anchoring of the liquid crystal (LC) domains. The trifunctional oligomer 206 may increase cross-linking to moderate phase separation during photopolymerization curing of the pre-polymer. The trifunctional monomer 208 may function as a fast cross-linker to fine tune anchoring of the LC domains in the polymer matrix of the PDLC display. In other words, the trifunctional monomer 208 may induce cross-linking of the pre-polymer matrix formulation 200 in a short duration of time (e.g., less than 10 seconds).

In some approaches, the duration of time to cure a PDLC formulation display may depend on the thickness of the display. In one approach, the speed of the cure may be very quick (e.g., the duration of time of curing is less than 10 seconds). For example, and not meant to be limiting in any way, for a PDLC formulation display having a thickness of 10 μm between transparent glass electrodes, the formulation may be cured in at least 2 seconds and no more than 5 seconds.

In some approaches, an optimized formulation for the pre-polymer matrix formulation (e.g., photosensitive thermosetting matrix) may include each component in the following concentration ranges. In one approach, the concentration of the monofunctional monomer 204 may be in a range of about 80 wt % to about 90 wt % of the total weight of the pre-polymer matrix formulation 200. In one approach, the concentration of the trifunctional oligomer 206 may be in a range of about 10 wt % to about 20 wt % of the total weight of the pre-polymer matrix formulation 200. In one approach, the concentration of the trifunctional monomer 208 may be in a range of about 1 wt % to about 2 wt % of the total weight of the pre-polymer matrix formulation 200.

In one approach, the pre-polymer formulation is added to a mixture of liquid crystals and cured to form a PDLC display formulation. In one approach, a PDLC display formulation includes a plurality of LC domains dispersed in a polymer matrix formed from the pre-polymer formulation described herein.

As illustrated in FIG. 2B, in one aspect of an inventive concept, a process 220 of forming PDLC display formulation 224 may include combining the pre-polymer matrix formulation 200 with a liquid crystal (LC) component 222. The liquid crystal component 222 may be dissolved in the pre-polymer matrix formulation 200 to form a PDLC display formulation 224.

As further illustrated in FIG. 2C, the PDLC display formulation 224 may be deposited between two transparent electrodes 225. The PDLC display formulation 224 has a known thickness th between the electrodes 225. Following exposure to UV irradiation, the UV-irradiated PDLC display formulation 226 undergoes a phase separation thereby resulting in the formation of LC domains 210. As shown in the magnified view of the UV-irradiated PDLC display formulation 226, a plurality of LC domains 210 may be dispersed in the cured matrix formulation 228, with each of the LC domains 210 including LC molecules 212. LC domains do not form until photo-induced phase separation following exposure to UV light.

In various approaches, the pre-polymer matrix formulation 200 may be configured to adjust a morphology of each LC domain 210 to have an average diameter d in a range of about 500 nanometers (nm) to about 2 microns (μm) as a result of UV exposure and photo-induced phase separation. A characteristic length of the LC domains containing LC molecules may vary from ~500 nm to 2 μm. In various approaches, the size of the LC domain may be tuned by varying the ratios of components A, B and C of the pre-polymer matrix formulation 200.

Figure 3A:
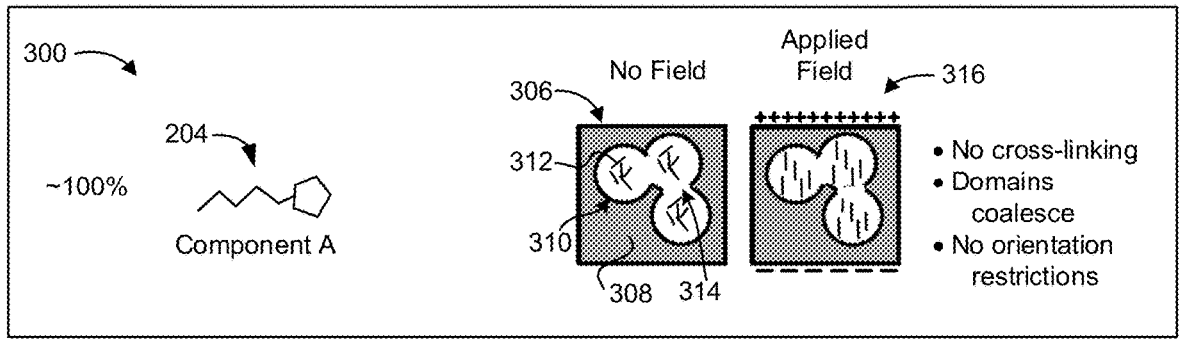
FIG. 3A is a schematic diagram of a pre-polymer formulation having nearly 100 wt % of monofunctional monomer (component A), according to one aspect of an inventive concept.
Figure 3B:
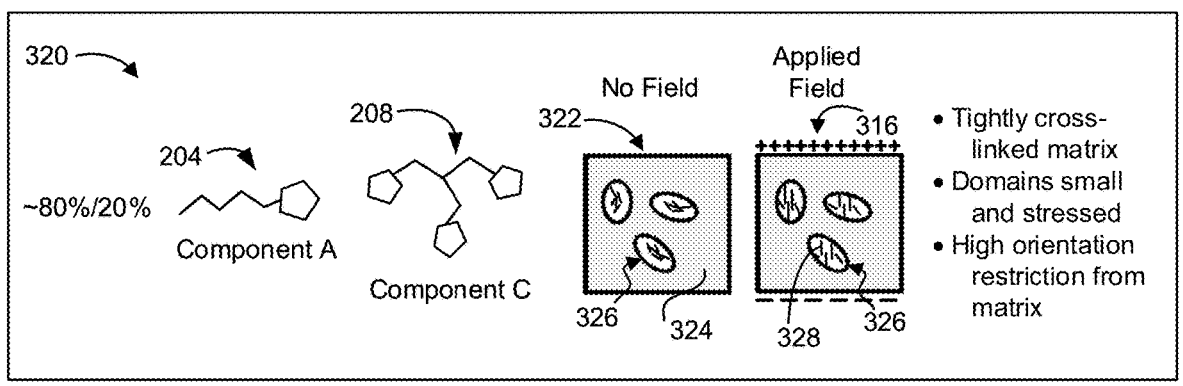
FIG. 3B is a schematic diagram of a pre-polymer formulation having about 80 wt % of monofunctional monomer (component A) and about 20 wt % of trifunctional monomer (component C), according to one aspect of an inventive concept.
Figure 3C:
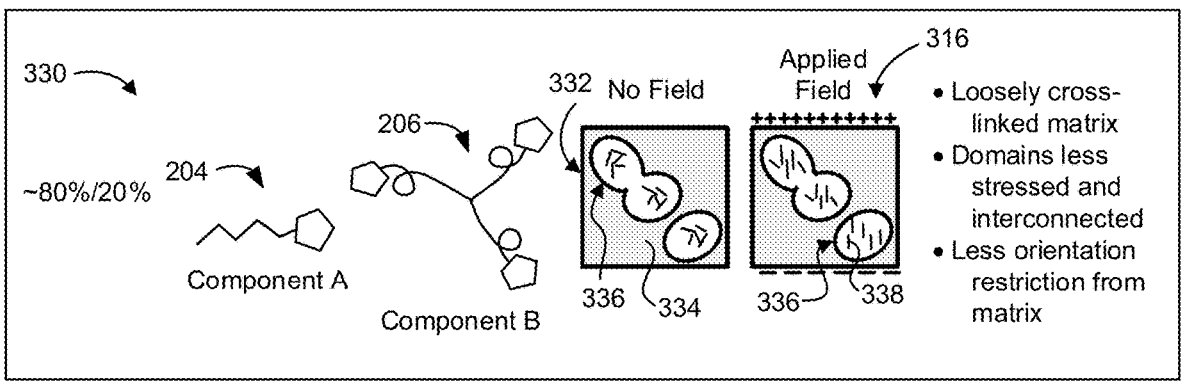
FIG. 3C is a schematic diagram of a pre-polymer formulation having about 80 wt % monofunctional monomer (component A) and about 20 wt % trifunctional oligomer (component B), according to one aspect of an inventive concept.

The components of the pre-polymer matrix of the PDLC display optimized for applying a DC electromagnetic field and mitigating transparency relaxation are illustrated in the schematic drawings of the PDLC microstructures of FIGS. 3A-3C.

For various approaches, microstructures of the optimal formations were analyzed and the optical contrast observed under applied DC electromagnetic fields.

In various approaches, LC domain morphology after phase separation within the polymer matrix may be directly dependent on the matrix curing kinetics. In some approaches, the LC molecules may exhibit decreased solubility in the matrix as the polymer matrix crosslinks with UV light exposure. In one approach, the LC molecules may exhibit decreased solubility in the polymer matrix as the matrix cures from a liquid to a gel, solid, etc. Increasing solubility of LC molecules in the cured polymer matrix may increase anchoring of the LC molecules to the polymer matrix and cause the aforementioned relaxation defects in LC domain morphology.

In various approaches, keeping anchoring effects preferably to a minimum thereby enabling full and consistent LC alignment is essential for maintaining a steady-state optical transparency during an applied DC electromagnetic field. As shown in FIGS. 3A-3C, various formulations of each component (monofunctional monomer 204, trifunctional oligomer 206, and/or trifunctional monomer 208) affect anchoring of the LC domains in the matrix of the PDLC display formulation.

As shown in FIG. 3A, a pre-polymer formulation 300 that includes about 100 wt % of monofunctional monomer 204 forms a PDLC display formulation 306 having polymer matrix 308 formed from the monofunctional monomer 204 and a plurality of LC domains 310 containing LC molecules 312. Without an applied field, increasing the monofunctional monomer 204 component may reduce cross-linking, thereby resulting in larger LC domains 310 and less anchoring effects. Anchoring effects may be reduced due to a decreased concentration of LC domains 310 trapped in the polymer matrix 308 as the polymerization rate decreases with increasing monofunctional monomer 204 concentration. Moreover, anchoring effects may be reduced with increasing monofunctional monomer 204 due to a reduction in the modulus (i.e. less stress on the LC domains 310).

However, the decreased cross-linked network (e.g., cross-linking may be negligible at a concentration of 100 wt % monofunctional monomer 204), the LC domains 310 may coalesce (arrow 314). Thus, in some approaches, it is preferable to have least 5 wt % of a cross-linking component to form a cross-linked network to separate the LC domains 310. Thus, with concentrations of monofunctional monomer 204 at greater than 98 wt %, there tends to be less relaxation of the LC domains 310.

Reducing cross-linking may also lead to decreased stress on the LC domains 310 and decreased relaxation as the modulus decreases along with the elasticity of the polymer matrix 308. As shown in FIG. 3A, reducing cross-linking to a minimum (i.e. ~100% monofunctional monomer), entirely spherical LC domains 310 may likely result and coalescence may likely occur. Thus, the PDLC display formulation 306 may not experience a steady transparency effect with the applied DC electromagnetic field 316. Moreover, the LC domains 310 may likely be too large to scatter light in the off state (No Field).

Thus, a pre-polymer formulation 300 of nearly 100 wt % monofunctional monomer 204 may demonstrate no cross-linking, the LC domains 310 may coalesce within the polymer matrix 308, and there may be no orientation restrictions. For example, the LC molecules may align during an applied field without restriction. Moreover, no scattering effects will be present during an applied field due to the larger LC domain size. In other words, the display may not transition from opaque to clear (e.g., transparent) during application of an electromagnetic field.

FIGS. 3B and 3C illustrate a two component system of pre-polymer matrix formulation 320 and 330, respectively. In some approaches, a non-variable optical transparency may be obtained in a two-component system with high concentrations (90-95%) of monofunctional monomer 204 and a second component. In some approaches, however, a lower contrast ratio may result in the two component system with high concentrations of monofunctional monomer and a second component.

In some approaches, a higher cross-link density may reduce overall LC domain size, increasing the off-state light scattering property (i.e. increasing opacity). Component B (trifunctional oligomer 206) and component C (trifunctional monomer 208) may each preferably be increased carefully as to not apply too much stress on the LC domain or trap a significant amount of LC in the polymer matrix. As illustrated in FIGS. 3B and 3C, varying ratios of component C or component B, respectively, incur modulus changes on the matrix.

Moreover, utilizing a trifunctional oligomer 206 such as component B may increase the polymerization rate of the pre-polymer matrix 320 and reduce the size of the LC domains 326 in the PDLC display formulation 322. However, in contrast to a multifunctional monomer such as component C (trifunctional monomer 208), a multifunctional oligomer (e.g., trifunctional oligomer 206, or component B) likely may not cause high stress on the phase-separating LC domains 326 due to less shrinkage compared to addition of trifunctional monomer.

As illustrated in FIG. 3B, a pre-polymer formulation 320 including about 80 wt % monofunctional monomer 204 and about 20 wt % trifunctional monomer 208 may result in a PDLC display formulation 322 having a tightly cross-linked matrix 324 with small, oblong and stressed LC domains 326 dispersed throughout the matrix 324.

Furthermore, the PDLC display formulation 322 may have a high orientation restriction from the matrix 324 during application of a DC electromagnetic field 316 (as shown by highly restricted orientation of the LC molecules 328 within the LC domains 326).

Looking to FIG. 3C, a trifunctional oligomer 206 such as component B in a concentration of about 20 wt % may provide less cross-linking with the monofunctional monomer 204 in a concentration of about 80 wt % in the pre-polymer matrix formulation 330. The PDLC display formulation 332 may include a loosely cross-linked matrix 334 with LC domains 336 less stressed compared to the LC domains 326 of the PDLC display formulation 322 that includes monofunctional monomer 204 and trifunctional monomer 208 (as illustrated in FIG. 3B). Moreover, the PDLC display formulation 332 may include LC domains 336 that are less interconnected compared to the LC domains 310 of the PDLC display formulation 306 that includes nearly 100 wt % monofunctional monomer 204 (as illustrated in FIG. 3A).

In addition, the PDLC display formulation 332 having higher concentrations of trifunctional oligomer (component B) demonstrate minor orientation restriction from matrix. Looking to the applied field of PDLC display formulation 332 in FIG. 3C, the LC domains 336 may include easily aligned LC molecules 338 in some instances.

Moreover, comparing a multifunctional oligomer (component B) to a multifunctional monomer (component C), component B may have a lower diffusion rate through the reacting system than the diffusion rate of component C through the reacting system. Furthermore, a lower polymerization rate may result in less trapped LC domains.

Moreover, in one approach, a multifunctional oligomer (e.g., trifunctional oligomer 206) having flexible "arms" may likely increase the modulus and elasticity to a lower magnitude compared to using solely using a multifunctional monomer (e.g., trifunctional monomer 208, or component C), thereby leading to less stress on the LC domains. Therefore, it is preferable to include a higher concentration of a multifunctional oligomer (e.g., trifunctional oligomer 206, or component B) into the polymer matrix than the multifunctional monomer (e.g., trifunctional monomer 208, or component C).

In one approach, an addition of 1 wt % to 2 wt % of multifunctional monomer, or component C, may act as molecular "tuning" agent to enable a matrix buffer between neighboring LC domains and to increase the modulus of the matrix to make more isolated LC domains. In other words, the presence of a multifunctional monomer, or component C, may prevent the LC domains from interconnecting with each other.

Moreover, a multifunctional monomer, or component C, may provide a constant optical effect with an applied DC electromagnetic field while also enabling a high optical contrast ratio between an off and on state. Only a small percentage of a multifunctional monomer, or component C, may be added as the phase-separation rate and polymer matrix modulus may highly impact the LC domain anchoring with increasing amounts of component C. Unlike with the increasing of component A, increasing component C by a 1-2 wt % only slightly increases the LC domain size, while also increasing the cross-link density of the matrix and increasing the polymerization and phase-separation rates.

In various approaches, a pre-polymer matrix formulation may have a ratio of the monofunctional monomer (component A) to the trifunctional oligomer (component B) to the trifunctional monomer (component C) to be A:B:C, where A is about 80 to 90, B is about 10 to 20, and C is about 1 to 2, where A+B+C=100.

FIG. 4 illustrates how including a multifunctional monomer, or component C, (e.g., trifunctional monomer 208) to the pre-polymer formulation 400 that includes about 90 wt % monofunctional monomer 204 and about 18 wt % multifunctional oligomer, or component B (e.g., trifunctional oligomer 206) may optimize the polymer matrix 406 of the PDLC display formulation 402 for DC electromagnetic field application 404 across the electrodes 412. In a preferred approach, critical amounts of monofunctional monomer, trifunctional oligomer, and trifunctional monomer may be about 80-90 wt % of monofunctional monomer, 10-20 wt % of trifunctional oligomer, and 1-2 wt % of trifunctional monomer, for optimal PDLC display switching without a transparency relaxation effect with an applied DC electromagnetic field (e.g., highest most stable transparency with applied DC electromagnetic field). It was surprising how sensitive the addition of component C (trifunctional monomer) influenced reduction of the transparency relaxation. Moreover, the polymer matrix 406 may be loosely cross-linked. The LC domains 408 may be less stressed and isolated from each other. There may be no orientation restriction of the LC molecules 410 from the matrix 406.

In other approaches, the reactive functional group of each of the components (component A, component B, and/or component C) may have different curing kinetics in response to UV light, and thus, the ratio of each component may be tuned according to the transparency relaxation effect. For example, and not meant to be limiting in any way, the reactive functional groups epoxide and mercaptan may have different curing kinetics in response to UV light compared to reactive acrylate groups.

FIG. 5A depicts a product 502 for a polymer dispersed liquid crystal (PDLC) display, in accordance with one aspect of an inventive concept. As an option, the present product 502 may be implemented in conjunction with features from any other aspects of an inventive concept listed herein, such as those described with reference to the other FIGS. Of course, however, such product 502 and others presented herein may be used in various applications and/or in permutations which may or may not be specifically described in the illustrative aspects of an inventive concepts listed herein. Further, the product 502 presented herein may be used in any desired environment.

FIG. 5A illustrates a schematic drawing of a micro-view 500 of a product 502 including the formation of a polymer dispersed liquid crystal (PDLC) display formulation 506 after UV exposure, according to one aspects of an inventive concept. In one approach, as shown in part (a) a pre-polymer formulation 504 includes monofunctional monomer 204, a trifunctional oligomer 206, and a trifunctional monomer 208 (as shown in FIG. 2A). Mixing the pre-polymer formulation with LC molecules 512 followed by UV curing results in a polymer dispersed liquid crystal (PDLC) display formulation 506 with LC domains 510 as illustrated in part (b) of FIG. 5A.

In one aspect of an inventive concept, a product 502 include a PDLC display formulation 506 that includes a polymer matrix 508 having a plurality of LC domains 510 dispersed throughout the polymer matrix 508. Each of the LC domains 510 includes LC molecules 512. The polymer matrix 508 may be a polymerized product of the pre-polymer formulation 504 including a monofunctional monomer 204, a trifunctional oligomer 206, and a trifunctional monomer 208 (as shown in FIG. 2A).

The product 502 may include a pair of electrodes 514 having the PDLC display formulation 506 positioned therebetween. The PDLC display formulation 506 may be characterized as having a substantially constant optical transparency during application of a low power direct current (DC) field between the electrodes 514 for a predefined duration of time. In one approach, the optical transparency remains substantially constant for as long as the DC electromagnetic field is present. In one approach, a substantially constant optical transparency may be defined as demonstrating a decrease in average rate of transmittance of less than 0.05% transmittance per 20 seconds of application of the DC electromagnetic field.

For example, and not wish to be limiting in any way, as shown in FIG. 10, the solid line represents of the transmittance of an exemplary formulation during application of 10 volts (V), 20 V and 30 V of DC voltage applied for 20 seconds each. The average transmittance of the exemplary formulation is substantially constant during application of each DC voltage. Moreover, as shown in FIG. 11, the solid line of the transmittance of an exemplary formulation demonstrates a sustained optical transparency over greater than 2000 seconds of application of a DC electromagnetic field.

In various approaches, the PDLC display formulation as described herein may sustain a substantially constant transparency during applied DC electromagnetic field for a duration of time in a range of greater than 10 seconds (s) to less than 3000 s (e.g., less than 50 minutes). In some approaches, the duration of time of sustained transparency may be greater than 100 s, 200 s, 500 s, 1500 s, 2000 s, 2500 s, 3000 s, etc.

Referring back to FIG. 5A, in one approach, as shown in part (b), during an Off-state in which no power is applied to the PDLC display formulation 506, the LC molecules 512 of the LC domains 510 exhibit a random orientation, thereby scattering light and presenting an opaque display. Application of DC power, as shown in part (c) of FIG. 5A, during an On-state, a low power DC electromagnetic field is created across the electrodes 514, and the LC molecules 512 align relative to the applied field, thereby resulting in an optically transparent display.

In one approach, the refractive index of the pre-polymer formulation 504 may be matched to the On-state refractive index of the LC molecules 512 thereby allowing a the PDLC display formulation 506 to have optical transparency during an On-state of an applied DC electromagnetic field.

FIG. 5B depicts a series of transparent images representing a macro-view of the inventive concept. Each image of part (a) and part (b) show a PDLC display 530 that includes spacers 536 on either side of the PDLC display formulation. In some approaches, the spacers provide a thickness of the display between each electrode 534 with the PDLC display formulation therebetween. In various approaches, the power applied to the electrodes of the PDLC display is dependent on the thickness of the display. In the display shown in FIG. 5B the thickness of the display provided by the spacers may be about 10 microns (µm).

The image in part (a) shows display 530 with a pre-polymer matrix formulation 532 positioned between the spacers 536 on each side and the transparent electrodes on the top and bottom of the display 530. As shown in part (a) the display 530 is transparent thereby demonstrating that no LC domains have formed nor can scatter light. The pre-polymer matrix formulation 532 includes LC molecules that are soluble in the pre-polymer.

The image of part (b) of FIG. 5B shows the display 530 having the PDLC display formulation 535 formed following UV curing of the pre-polymer matrix formulation 532 of part (a). The PDLC display formulation 535 includes a polymer matrix 538 having LC domains 539 dispersed throughout the polymer matrix 538, as shown in the magnified view of part (b). LC domains 539 are formed via a photo-induced phase separation of the PDLC display formulation 535 and scatter light, rendering the display 530 opaque.

As shown in the image of part (c), a PDLC display formulation 535 with no field applied, as indicated by "OFF", shows an opaque display with a pattern 540 beneath the PDLC display formulation 535 barely visible through the opaque display. As shown in the image of part (d), applying a DC electromagnetic field, e.g. 2.5 μW, to the PDLC display formulation 535 enables the display to go from opaque (OFF, part (c)) to transparent (ON), in which the pattern 540 is clearly visible beneath the PDLC display formulation 535 under an applied DC electromagnetic field, as shown in the image of part (d).

In an alternative approach, the refractive index of a pre-polymer formulation may be matched to the Off-state refractive index of the LC domains, and thus during the On-state, there would be a mismatch in refractive index between the LC domains and the pre-polymer formulation thereby resulting in scattering light and an opaque display.

In one approach, the low power DC electromagnetic field may be at least 2.5 μW. In another approach, the low power DC electromagnetic field may be in a range of at least 2.5 μW to less than 30 μW.

In one approach, the PDLC display formulation 506 may have a thickness th defined between the electrodes 514, where a DC voltage may be applied to the electrodes 514 in a range of greater than 2.5 V of the thickness th to less than 30 V of the thickness th.

Without wishing to be bound by any theory, it is believed that as polymerization induced phase separation occurs, the LC molecules may be expelled from the polymer matrix with decreased solubility, thereby causing LC domains that are held in the LC domain shape. In one approach, as the polymer matrix cures from a liquid (e.g., soluble with LC molecule) to a solid state (e.g., insoluble to the LC molecules) with UV exposure, the LC molecules are expelled from the forming matrix into LC domains. Less anchoring may occur when applying a field, while maintaining smaller LC domains for higher contrast ratios. Therefore, this optimized formulation may achieve high transparency PDLC displays using DC electromagnetic fields.

FIG. 6 depicts a schematic drawing of a system 600 of a PDLC display, according to one aspect of an inventive concept. The system 600 includes a polymer dispersed liquid crystal (PDLC) display formulation 602 comprising a polymer matrix 604 having a plurality of LC domains 603 dispersed therein. Each of the LC domains 603 include LC molecules. The polymer matrix 604 may a have a pre-polymer formulation including a monofunctional monomer, a trifunctional oligomer, and a trifunctional monomer.

In one approach, the system 600 includes a first substrate 606 and a second substrate 608, where the PDLC display formulation 602 may be disposed between the first substrate 606 and the second substrate 608.

In one approach, a PDLC display may include at least one electrode layer where the PDLC display formulation is positioned adjacent to the at least one electrode layer. As shown in FIG. 6, in one approach, the system 600 includes a pair of electrode layers 612, 613 where the PDLC display formulation 602 may be positioned therebetween the electrode layers 612, 613. In one approach, each electrode layer 612, 613 is on each of the first and second substrates 606, 608. In one approach, each electrode layer is a portion of the first and second substrate. The system 600 includes a power circuit 614 for applying a direct current (DC) electromagnetic field across the electrode layers 612, 613 (e.g., electrical contacts).

In another approach, a PDLC display may include a planar electrode having interdigitated electrodes such that the planar electrode may mitigate two separate electrodes positioned adjacent to the PDLC display formulation.

In one aspect of the inventive concept, the PDLC display formulation may be sandwiched between two conductive substrates and cured with UV light to form a PDLC layer with non-periodic randomly arranged (randomized) liquid crystal domains in the sub-micrometer range. In one approach, the material 610 of the first and second substrates 606, 608 is the same. In another approach, the material of the first substrate 606 and the second substrate 608 is different. In one approach, the material of a conductive substrate may be rigid. In another approach, the material of the conductive substrate may be flexible. In some approaches, the material 610 of the first and second substrates 606, 608 may be one of the following: glass material, polymeric material, etc.

In one approach, the PDLC display formulation 602 may have a thickness th defined between the first substrate 606 and the second substrate 608. In one approach the thickness th may be defined between the first electrode 612 and the second electrode 613. In one approach, the thickness th may be in a range of greater than about 5 μm to less than about 80 μm.

In one aspects of an inventive concept, a low power DC electromagnetic field is applied to the PDLC display as described herein to obtain high transparency, angle-independent, and non-variable optical effects during the entirety of the field application. In some approaches, a low power DC electromagnetic field may be in a range of microwatts (μW) of the thickness of the PDLC display formulation. In one approach, the DC electromagnetic field generated by the power circuit 614 may be at least 2.5 μW. In some approaches, the power of applied DC electromagnetic field may be in a range of about 2.5 μW of the thickness to about 30 μW of the thickness, but may be higher or lower.

In one approach, the DC voltage of the power circuit 614 may be applied to the electrodes 612, 613 in a range of greater than 2.5 V of the thickness th to about 30 V of the thickness th.

In one approach, the PDLC display formulation 602 may be configured to have an optical transparency during application of a low power DC electromagnetic field generated by the power circuit 614. In one approach, the optical transparency may remain substantially constant during the application of the low power DC electromagnetic field generated by the power circuit 614.

Experiments

As illustrated in FIG. 7A, increasing the component A/component B ratio (e.g., monofunctional monomer 204/trifunctional oligomer 206) reduces anchoring between the LC domains. As illustrated in FIG. 7B, increasing the ratio of component A to component B reduces relaxation. The plot of transmission over time in FIG. 7B shows the response of formulations having component A at 80 wt % (dashed line), 85 wt % (dotted line) and 90 wt % (solid line) during application of a DC electromagnetic field of 10 V at 10 seconds (s) and 20 V at 40 s. These results show that the highest concentration of component A (90 wt %, solid line) demonstrated reduced anchoring of the LC domains (substantially constant transmission) compared to 85 wt % (dotted line) and 80 wt % (dashed line). As shown in FIG. 7C, the SEM image of a polymer formulation having 90 wt % component A shows the matrix having LC domains that tend to be larger with few interconnects between LC domains.

In various approaches, the optimal concentration of component C to the matrix formulation has a critical role in the optical effect of the matrix formation with a DC electromagnetic field. As illustrated in the summary diagram of FIG. 8A, a high concentration of component A (monofunctional monomer) at 90 wt % to component C (trifunctional monomer) 1 wt % (90A/1C) results in a lower modulus (Low R) with high transmission (Hi T) at both 10 V and 20 V applied DC compared to 80A/1C (80 wt % component A to 1 wt % component C) having a high modulus (Hi R) demonstrating low transmission (Lot T) and high relaxation (Hi R) at 10 V.

Looking to the plot of modulus in FIG. 8B, increasing the A/C ratio (from 80A/1C to 90A/1C) lowers the matrix modulus. Thus, increasing the A/C ratio reduces relaxation (Hi R to Low R, as shown in FIG. 8A) with a lower matrix modulus (as shown in FIG. 8B).

As illustrated in FIG. 9, increasing component C (trifunctional monomer) from 1 wt % (dashed line) to 2 wt % (solid line) reduces relaxation during applied DC electromagnetic field. Without wishing to be bound by any theory, it is believed that component C reduces relaxation by isolating LC domains.

FIG. 10 compares applying a DC electromagnetic field to PDLC displays having a commercial pre-polymer matrix formulations typically used under AC fields (plot line with black circles) to applying a DC electromagnetic field to a PDLC display having an optimal formulation as described herein (solid plot line). As shown in FIG. 10, a DC electromagnetic field is applied at three intervals, a first interval having 10 V applied for 20 seconds (10 s to 30 s), a second interval having 20 V applied for 20 seconds (40 s to 60 s), and the third interval having 30 V applied for 20 second (70 s to 90 s). According to these results, even with a higher driving force to orient the commercial formulation, a drop in transmittance after an initial pulse (i.e., transparency relaxation) occurs with the commercial formulation even at the higher DC voltages (third interval at 30 V).

With no applied DC electromagnetic field (no DC voltage applied from 0 to 10 s), both formulations are opaque with near zero transmittance. Applying a DC electromagnetic field to the PDLC displays with commercial polymer matrix formulations, the initial transparency may be reduced during application of the of DC power (for example, during the first 3-20 ms).

In preferred approaches of the PDLC display formulation as described herein, applying the same DC electromagnetic field to a PDLC display formulation by fine tuning the pre-polymer formulation of the matrix (shown in the solid plot line of FIG. 10), may demonstrate a higher transmittance of the PDLC display during application of the DC electromagnetic field, and the optical contrast relaxation may be mitigated for the entire time the DC electromagnetic field is applied. As shown in the plot of the solid line of FIG. 10, the PDLC display does not demonstrate a drop in transmittance during applied DC electromagnetic field compared to the drop in transmittance of the commercial formulation during the applied DC electromagnetic field (plot line with black circles). These results suggest that the PDLC display formulation may mitigate the relaxation effect of the LC domains in the preferred PDLC display whereas the commercial formulation demonstrates remarkable relaxation effects of the LC domains (as shown by the sharp drop in transmittance during applied DC electromagnetic field).

According to one aspect of an inventive concept, a fine-tuned formulation of three components (component A, component B, and component C as described herein) is critical for a PDLC display formulation using applied DC power. Commercial formulations of the polymer matrix for PDLC displays operated under AC power do not operate well as a PDLC display formulation under DC power. As shown in FIG. 10, the PDLC display formulation as described herein shows criticality of the claimed range of components A, B, and C for the formulation used in FIG. 10. However, applying DC power to a PDLC display comprised of the commercial pre-polymer matrix formulation will likely result in a relaxation effect on the LC domains as indicated by a decrease in transmittance.

Furthermore, the commercial formulation responded to the low power of the applied DC electromagnetic field with a low response compared to the high response to the lower power of the optimized formulation. The ranges of components A, B, and C of the optimized formulation were critical for optimal response during application of a DC electromagnetic field at low power.

As illustrated in FIG. 11, an optimized pre-polymer formulation for a PDLC display for a DC electromagnetic field enables constant transparency for prolonged DC electromagnetic field application. As shown in FIG. 11, the transmission (left axis, solid line) remained constant for greater than 2000 seconds with a steady direct current (µA, right axis, dashed line).

In Use

Various aspects of inventive concepts described herein may be developed for low-powered electro-optical modulators that operate under DC electromagnetic field conditions, thereby enabling a standalone product when in conjunction with an energy harvesting device. Application of these aspects of an inventive concepts may range from smart windows, displays, transparency glazing, etc.

The inventive concepts disclosed herein have been presented by way of example to illustrate the myriad features thereof in a plurality of illustrative scenarios, aspects of an inventive concepts, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various aspects of an inventive concepts have been described above, it should be understood that they have been presented by way of example only, and not limitation. Thus, the breadth and scope of an aspects of an inventive concept of the present invention should not be limited by any of the above-described exemplary aspects of an inventive concepts, but should be defined only in accordance with the following claims and their equivalents.

What is claimed is:

1. A product, comprising:
   a polymer dispersed liquid crystal (PDLC) display formulation comprising a polymer matrix having a plurality of liquid crystal (LC) domains dispersed therein, wherein the polymer matrix comprises a polymerized product of a monofunctional monomer, a trifunctional oligomer, and a trifunctional monomer;
   a pair of electrodes having the PDLC display formulation positioned therebetween; and
   a direct current electromagnetic field power circuit coupled to the pair of electrodes,
   wherein the power circuit is configured to cause formation of a direct current electromagnetic field, the direct current electromagnetic field being at least 2.5 µW,
   wherein the PDLC display formulation is opaque in the absence of application of a low power direct current electromagnetic field between the electrodes, and wherein the PDLC display formulation is characterized as having a substantially constant optical transparency during application of the low power direct current electromagnetic field between the electrodes for a predefined duration of time.

2. A product as recited in claim 1, wherein the PDLC display formulation is configured to have the substantially constant optical transparency during application of the low power direct current electromagnetic field in a range of at least 2.5 µW to less than 30 µW.

3. A product as recited in claim 1, wherein the power circuit is configured to cause formation of a direct current at a voltage in a range of greater than 2.5 volts to less than 30 volts.

4. A product as recited in claim 1, wherein the predefined duration of time is in a range of greater than 10 seconds to less than 3000 seconds.

5. A product as recited in claim 1, wherein a concentration of the monofunctional monomer is in a range of 80 weight % to 90 weight % of a total weight of the polymer matrix.

6. A product as recited in claim 1, wherein a concentration of the trifunctional oligomer is in a range of 10 weight % to 20 weight % of a total weight of the polymer matrix.

7. A product as recited in claim 1, wherein a concentration of the trifunctional monomer is in a range of 1 weight % to 2 weight % of a total weight of the polymer matrix.

8. A product as recited in claim 1, wherein the polymer matrix is configured to prevent interconnection of the LC domains with each other in the polymer matrix.

9. A product as recited in claim 1, wherein the LC domains comprise a plurality of liquid crystal (LC) molecules.

10. A product as recited in claim 9, wherein an average diameter of the LC domains is in a range of about 500 nanometers to about 2 microns.

11. A product as recited in claim 9, wherein there is no orientation restriction of the LC molecules from the polymer matrix.

12. A product, comprising:
a polymer dispersed liquid crystal (PDLC) display formulation comprising a polymer matrix having a plurality of liquid crystal (LC) domains dispersed therein, wherein the polymer matrix comprises a polymerized product of a monofunctional monomer, a trifunctional oligomer, and a trifunctional monomer;
a pair of electrodes having the PDLC display formulation positioned therebetween; and
a power circuit configured to cause formation of a low power direct current electromagnetic field of at least 2.5 µW,
wherein the PDLC display formulation is characterized as having a substantially constant optical transparency during application of the low power direct current electromagnetic field between the electrodes for a predefined duration of time wherein the predefined duration of time is greater than 10 seconds.

13. A product as recited in claim 12, wherein the PDLC display has an opaque display with no application of power.

14. A product as recited in claim 13, wherein the PDLC display formulation is configured to have the substantially constant optical transparency during application of the low power direct current electromagnetic field in a range of at least 2.5 µW to less than 30 µW.

15. A product, comprising:
a polymer dispersed liquid crystal (PDLC) display formulation comprising a polymer matrix having a plurality of liquid crystal (LC) domains dispersed therein,
wherein the polymer matrix comprises a polymerized product of a monofunctional monomer, a trifunctional oligomer, and a trifunctional monomer; and
a pair of electrodes having the PDLC display formulation positioned therebetween; and
a direct current electromagnetic field power circuit coupled to the pair of electrodes, wherein the power circuit is configured to cause formation of the direct current electromagnetic field, the direct current electromagnetic field being at least 2.5 µW,
wherein the PDLC display formulation is characterized as having a substantially constant optical transparency during application of a low power direct current electromagnetic field between the electrodes for a predefined duration of time.

16. A product as recited in claim 15, wherein the PDLC display formulation has an opaque display with no application of power.

17. A product as recited in claim 1, wherein the constant optical transparency corresponds to the PDLC display formulation configured to demonstrate a decrease in average rate of transmittance of less than 0.05% transmittance over 20 seconds of application of the low power direct current electromagnetic field.

18. A product as recited in claim 9, wherein the polymer matrix is configured to have a refractive index that matches a refractive index of substantially aligned LC molecules, wherein the LC molecules are configured to be substantially aligned in response to presence of the low power direct current electromagnetic field.

19. A product as recited in claim 15, wherein the polymer matrix is based on one of combinations of reactive functional groups selected from the group consisting of: acrylate-acrylate, acrylate-mercaptan, mercaptan-epoxide, and epoxide-epoxide.

* * * * *